United States Patent [19]

Worthington et al.

[11] Patent Number: 4,652,431
[45] Date of Patent: Mar. 24, 1987

[54] PROCESS FOR RECOVERING URANIUM USING AN ALKYL PYROPHOSPHORIC ACID AND ALKALINE STRIPPING SOLUTION

[75] Inventors: Ralph E. Worthington, Winter Haven; Alex Magdics, Lakeland, both of Fla.

[73] Assignee: Prodeco, Inc., Mulberry, Fla.

[21] Appl. No.: 238,555

[22] Filed: Feb. 26, 1981

[51] Int. Cl.$^4$ ............................................. C01G 43/00
[52] U.S. Cl. ...................................... 423/10; 423/15; 423/17; 423/260
[58] Field of Search ................... 423/8, 10, 15, 17, 260

[56] References Cited

U.S. PATENT DOCUMENTS

| | | | |
|---|---|---|---|
| 2,859,094 | 11/1958 | Schmitt et al. | 23/14.5 |
| 2,866,680 | 12/1958 | Long | 23/14.5 |
| 2,947,774 | 8/1960 | Levine et al. | 260/461 |
| 3,052,513 | 9/1962 | Crouse | 423/10 |
| 3,835,214 | 9/1974 | Hurst et al. | 423/18 |
| 3,987,145 | 10/1976 | Bruns et al. | 423/10 |
| 4,002,716 | 1/1977 | Sundar | 423/10 |
| 4,238,457 | 12/1980 | Sialino et al. | 423/10 |
| 4,243,637 | 1/1981 | Bradford et al. | 423/10 |
| 4,255,392 | 3/1981 | Chiang | 423/11 |
| 4,311,676 | 1/1982 | Demarthe et al. | 423/10 |
| 4,356,153 | 10/1982 | Bathellier et al. | 423/10 |
| 4,371,505 | 2/1983 | Pautrot | 423/10 |

FOREIGN PATENT DOCUMENTS

| | | |
|---|---|---|
| 2423545 | 11/1979 | France . |
| 2435444 | 4/1980 | France . |
| 2449652 | 9/1980 | France . |
| 2450233 | 9/1980 | France . |
| 2459205 | 1/1981 | France . |
| 2461681 | 2/1981 | France . |
| 2013643 | 8/1979 | United Kingdom . |
| 2054545 | 2/1981 | United Kingdom . |

OTHER PUBLICATIONS

Hurst, F. J. et al., "Recovery of Uranium from Wet--Process Phosphoric Acid", *Industr. Eng. Chem. Process, Design, Development*, 1972, V. 11, No. 1, p. 122.
Skorovarova, "Gidrometallurgicheskaya Pererabotka Uranorudnogo Syr'ye [Hydrometallurgical Treatment of Uranium Ore]", Atomizizdat, Moscow, 1979, pp. 143-145, 150.
Ellis, D. A., "The Recovery of Uranium from Industrial Phosphoric Acids by Solvent Extraction", *DOW*-81, 1952.
Hurst et al., "Solvent Extraction of Uranium from Wet-Process Phosphoric Acid", ORNL-TM-2522, Apr. 1969.
Zangen, "The Composition of 'OPPA'", *Journal of Inorganic and Nuclear Chemistry*, vol. 16, 1960/61, pp. 165, 166.
Zangen et al., "Products of the Reaction Between Alcohols and Phosphorus Pentoxide—Identification by Infrared Spectrophotometry, *Israel Journal of Chemistry*, vol. 5, 1967, pp. 89-100.
Zangen et al., "Product of the Reaction Between Alcohols and Phosphorus Pentoxide: I. Identity and Extractant Efficiency of the Various Products", *Separation Science*, vol. 2, 1967, pp. 187-197.
Zangen et al., "Products of the Reaction Between Alcohols and Phosphorus Pentoxide: II. Chromatographic Separation of the Products", *Separation Science*, vol. 3, 1968, pp. 1-9.

*Primary Examiner*—Edward A. Miller
*Attorney, Agent, or Firm*—Fleit, Jacobson, Cohn & Price

[57] ABSTRACT

A process is described for the recovery of uranium from wet-process phosphoric acid utilizing an alkyl pyrophosphoric extractant. The extractant also contains a modifier for retaining the alkyl pyrophosphoric acid in solution in an essentially water-immiscible organic diluent during stripping. After extracting the uranium from wet-process acid, the APPA extractant is treated with an oxidizing agent such as hydrogen peroxide and the uranium stripped into an alkaline stripping solution. The alkaline stripping solution is an aqueous solution of an alkali metal or ammonium carbonate or hydroxide. The barren extractant is recycled for contacting with fresh wet-process acid. The uranium and any ferric iron present is precipitated in the stripping solution. The uranium is dissolved in an aqueous solution such as an aqueous solution of ammonium uranyl tricarbonate (AUT), any precipitated ferric solids are separated from the solution, and the uranium is reprecipitated, separated, dried and calcined to a $U_3O_8$ product.

42 Claims, 1 Drawing Figure

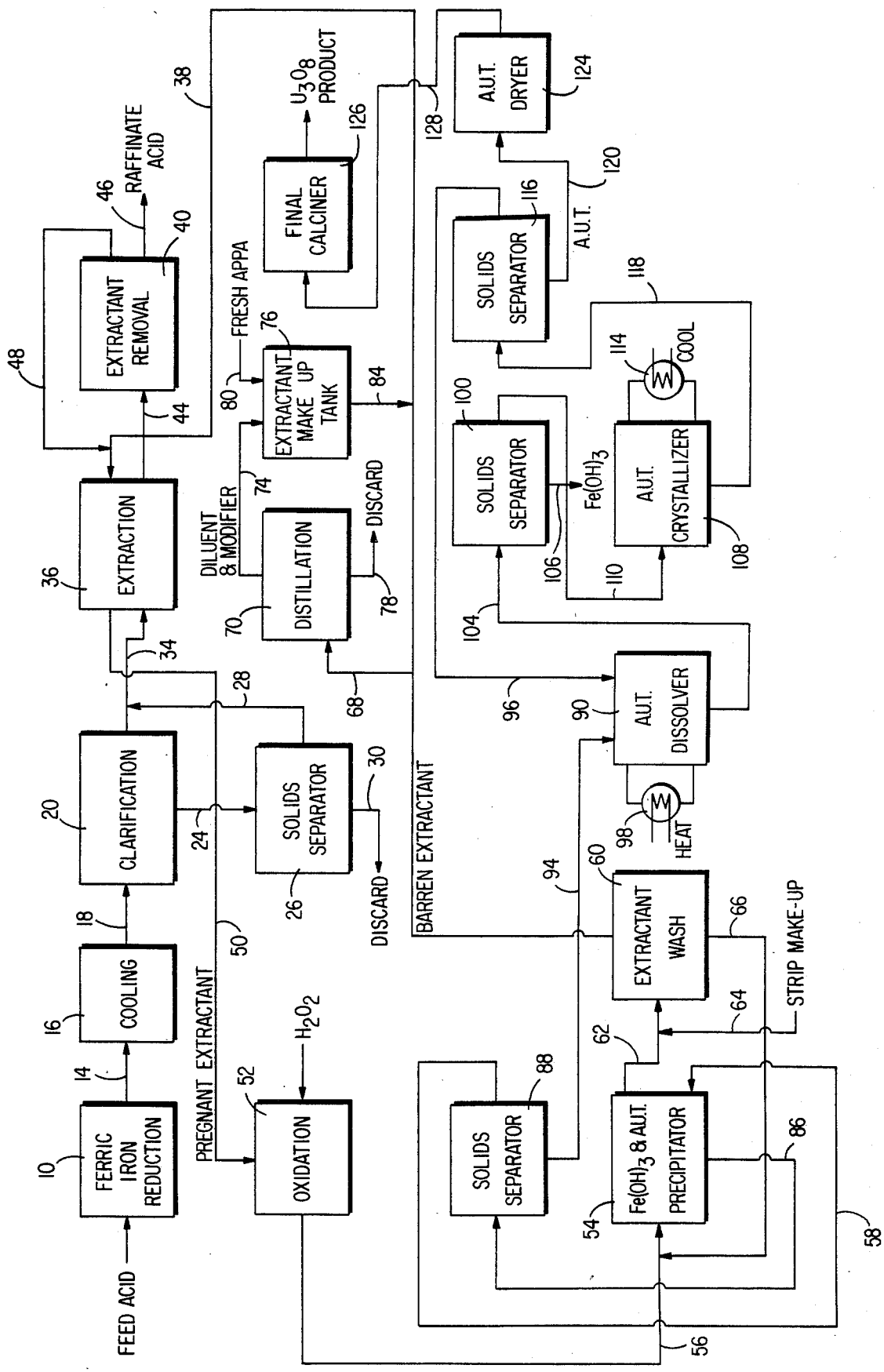

PROCESS FOR RECOVERING URANIUM USING AN ALKYL PYROPHOSPHORIC ACID AND ALKALINE STRIPPING SOLUTION

BACKGROUND OF THE INVENTION

Minable phosphate is found in a number of places throughout the world, and in many of these deposits small quantities of uranium are found complexed with the phosphate values. The large phosphate deposit in central Florida, for example, contains from 0.01 to 0.02 weight percent uranium. This uranium is taken into solution when the phosphate is acidulated with mineral acid to produce wet-process phosphoric acid.

The early work on the recovery of uranium from wet-process acid is described in a publication referred to as DOW-81 and entitled "Recovery of Uranium from Industrial Phosphoric Acid by Solvent Extraction". Alkyl pyrophosphoric acid was found to be very efficient in selectively extracting uranium from phosphoric acid and several flow sheets utilizing this type of extractant are shown in U.S. Pat. No. 2,866,680. Prior processes for recovering uranium using a pyrophosphoric acid extractant include processes in which uranium is stripped from the extractant into an acidic stripping solution. It is also known to strip uranium from the extractant into an alkaline stripping solution as disclosed in French Pat. No. 2,423,545. In this process, part of the pyrophosphoric acid esters is stripped into the alkaline stripping solution and is subsequently redissolved in the diluent of the organic extractant solution. A modifier such as a long chain alcohol is added to the extractant for the purpose of retarding hydrolysis of the pyrophosphoric acid esters.

It is an object of the present invention to provide an improved process for recovering uranium from wet-process phosphoric acid using an alkyl pyrophosphoric acid extractant and an alkaline stripping solution.

A further object of the present invention is to provide an improved process for recovering uranium from wet-process acid in which uranium is precipitated from an alkyl pyrophosphoric acid extractant into an alkaline stripping solution.

Still a further object of the present invention is to provide a process for recovering uranium from wet-process phosphoric acid using an alkyl pyrophosphoric acid extractant and alkaline stripping solution in which the pyrophosphoric acid esters remain dissolved in the extractant solution during stripping.

Yet a further object of the present invention is to provide a process for recovering uranium from wet-process acid including means for handling any ferric iron which may also be precipitated in the alkaline stripping solution and for removing pyrophosphoric acid ester decomposition products from the extractant.

A still further object of the present invention is to provide a process for recovering uranium from wet-process acid which is economical and minimizes consumption of costly reagents.

SUMMARY OF THE INVENTION

In accordance with the present invention, uranium is stripped from an organic extractant containing an alkyl pyrophosphoric acid such as isodecyl pyrophosphoric acid as the extractant agent into an alkaline stripping solution. The pyrophosphoric acid ester in the organic extractant is dissolved in a suitable essentially water-immiscible organic diluent such as kerosene. The organic extractant contains tetravalent uranium extracted from wet-process phosphoric acid. The organic extractant also contains an alcohol or phenol modifier added to the organic extractant in a quantity sufficient to retain the pyrophosphoric acid esters in solution in the diluent during stripping. The maximum quantity of modifier added to the organic extractant is about 1 mole of the modifier per atom of phosphorus (P) contained in the organic extractant. This quantity of modifier corresponds to the theoretical quantity necessary for hydrogen bonding of each oxygen doubly bonded to a phosphorus atom.

The organic extractant is treated with an oxidizing agent such as hydrogen peroxide to oxidize the tetravalent uranium in the pregnant extractant. The extractant is then stripped with the alkaline stripping solution which comprises an aqueous solution of an alkali metal or ammonium carbonate or hydroxide such as an aqueous solution of ammonium carbonate. During contact between the alkaline stripping solution and the pregnant organic extractant, uranium is stripped from the extractant into the stripping solution where it is precipitated. Because of the presence of the modifier in the organic extractant, however, the pyrophosphoric acid esters remain dissolved in the diluent in the organic extractant.

The barren organic extractant is preferably washed to remove any stripping solution entrained in the extractant and then is recycled for contacting with fresh wet-process acid. A portion of the recycled barren organic extractant is treated, such as by distillation, to separate diluent and modifier from the pyrophosphoric acid esters and any decomposition products. Fresh pyrophosphoric acid esters are added to the separated diluent and modifier tof form a fresh organic extractant solution. The fresh organic extractant solution is added to the recycled barren organic extractant. In this manner, the extraction coefficient of the extractant is maintained at a relatively high level.

Ferric iron is typically extracted into the organic extractant during contact with the wet-process phosphoric acid even when reduced acid is employed. A portion of this ferric iron is stripped into the alkaline stripping solution during contact between the organic and aqueous phases during stripping and is precipitated in the stripping solution as ferric oxide ($Fe(OH)_3$).

After separating the uranium and ferric iron precipitates from the stripping solution, the uranium precipitate can be dissolved in an aqueous solution, such as an unsaturated solution of ammonium uranyl tricarbonate, the ferric iron precipitate separated from the aqueous solution, and the dissolved uranium reprecipitated to form a product which can be decomposed thermally to yield high-grade $U_3O_8$.

BRIEF DESCRIPTION OF THE DRAWINGS

The FIGURE is a schematic flow sheet illustrating the recovery of uranium from wet-process phosphoric acid.

DESCRIPTION OF THE PREFERRED EMBODIMENTS

Wet-process phosphoric acid which is obtained by the acidulation of uncalcined phosphate rock with sulfuric acid and which can contain about 25 to 45% $P_2O_5$ by weight, more typically about 25 to 35% $P_2O_5$, is treated so that ferric iron in the wet-process acid is reduced to the ferrous state. Since the oxidation state of the iron tends to control the oxidation state of the uranium, substantially all of the uranium will be in the reduced tetravalent state even at relatively high ferric iron concentrations. However, to minimize ferric iron interference with extraction and stripping, the ferric iron should be reduced such that the ferric iron concentration is at least about 8 g/l or below, preferably at least about 2 g/l or below.

The manner in which the ferric iron is reduced is not critical. The ferric iron can be reduced using a chemical reductant such as iron metal, silicon metal, or an iron-silicon alloy commonly referred to in the art as a ferrosilicon alloy having a silicon content from about 5 to 100% by weight, preferably about 5 to 80% by weight, and most preferably about 5 to 20% by weight. The ferric iron also can be reduced using electrolytic reduction. In the reduction step, $Fe^{+3}$ is reduced to $Fe^{+2}$ and any $U^{+6}$ to $U^{+4}$. As indicated above, it is not necessary that all of the $Fe^{+3}$ be reduced to the lower valence state in order to effectively extract the uranium from wet-process acid. Thus, the extent to which the ferric iron concentration in the wet-process acid is reduced is a question of economics based on the overall uranium recovery process.

The reduced wet-process acid is cooled using any conventional technique such as cooling water or an evaporator. The temperature of the wet-process acid is typically about 60° to 80° C. It is preferred to cool the acid to about 55° C. or below, more preferably about 30° to 50° C. Cooling the acid increases the extraction coefficient during extraction and improves the uranium recovery process. Again, however, the extent to which the acid is cooled, if any, is a question of economics based on the overall uranium recovery process.

The cooled wet-process acid is clarified to at least partially remove inorganic solids such as calcium sulfate (gypsum) and organic solids such as humics. There are several techniques known in the art for clarifying wet-process acid and any of these techniques can be employed. For example, a rake tank classifier or Lamella clarifier can be employed to clarify the acid. The clarification step may employ a separate solids separation unit. Preferably, the clarified acid is then passed through a polishing filter to reduce the solids concentration to about 20 parts per million (ppm) or less.

The uranium in the clarified acid is extracted with an alkyl pyrophosphoric acid (APPA). The various APPA extractants that can be used include those disclosed in U.S. Pat. No. 2,866,680. The APPA extractants are the reaction product of phosphoric oxide and an alcohol which typically has a chain length of from 4 to 20 carbon atoms, preferably from 6 to 12 carbon atoms. The reaction product is a complex mixture as indicated by "Products of the Reaction Between Alcohols and Phosphorus Pentaoxide: Identity and Extraction Efficiency of the Various Products", M. Zangen, Y. Marcus and E.D. Bergmann, *Separation Science*, (2), pp. 187–197, 1967. Methods for preparing the APPA extractants are disclosed in U.S. Pat. Nos. 2,866,680 and 2,947,774, the disclosures of which are expressly incorporated herein by reference. It is preferred to form the APPA extractants using the method disclosed in U.S. Pat. No. 2,947,774 except that it is preferred to use a temperature of about 50° C. or less during the alcohol addition to the phosphoric oxide and to subsequently filter the reaction mixture or increase the temperature to about 90° C. for about 15 minutes.

The APPA extractant is dissolved in an essentially water-immiscible organic diluent. Suitable diluents include, for example, aliphatic hydrocarbons, petroleum fractions low in aromatics, and chlorinated hydrocarbons. The preferred diluents are refined high-boiling, high-flash point petroleum fractions containing between 10 and 50% by volume naphthenes with the balance being principally aliphatic.

The APPA concentration in the extractant solution is generally about 10 to 100 g/l. The concentration of APPA in the extractant solution which is used in practice will be determined by various factors in the overall process such as the ferric iron concentration in the wet-process acid and the temperature to which the acid is cooled.

The extractant solution contains a modifier to retain the salts of APPA formed during stripping in solution in the diluent. The modifier is any essentially water-immiscible alcohol or phenol which is soluble in the diluent and contains an —OH group which will bond to the doubly bonded oxygen on the phosphate grouping of the pyrophosphoric acid by hydrogen bonding. The alcohol can be an aliphatic or substituted aliphatic or alicyclic alcohol containing 4 to 20, preferably 6 to 12, carbon atoms. Preferably, the same or a similar chain length alcohol is used as a modifier as is used to prepare the APPA (e.g., an octanol modifier is used when octanol is used to prepare octyl pyrophosphoric acid). The phenol can be a substituted or unsubstituted phenol. The preferred phenols are nonylphenol and octylphenol, both of which are commercially available.

The modifier is added to the organic extractant in a quantity sufficient to retain the APPA salts formed during stripping in solution in the diluent. Since the modifier depresses the extraction coefficient of the pyrophosphoric acid, the quantity of modifier added to the organic extractant is controlled to maximize the solubility of the APPA salts in the diluent while avoiding the addition of modifier which would unnecessarily depress the extraction coefficient of the APPA extractant. The maximum quantity of modifier added to the organic extractant in about 1 mole of the modifier per atom of phosphorus (P) contained in the organic extractant. This quantity of modifier corresponds to the theoretical quantity necessary for hydrogen bonding of each oxygen doubly bonded to a phosphorus atom.

The maximum quantity of modifier added to the organic extractant is defined in terms of the phosphorus atom concentration since the APPA extractant is a complex mixture which may contain a number of ingredients in addition to the diesters of pyrophosphoric acid. Referring specifically to the diesters of pyrophosphoric acid, the maximum quantity of modifier theoretically required for hydrogen bonding of each oxygen doubly bonded to a phosphorus atom is 2 moles of modifier per mole of diester since each mole of the diester contains two phosphorus atoms. Generally, the weight ratio of the modifier to the APPA required to retain the APPA salts formed during stripping in solution in the diluent and yet avoid any unnecessary depression of the extraction coefficient will be about $\frac{1}{2}$ to $\frac{3}{4}$, preferably about $\frac{1}{2}$ to $\frac{2}{3}$.

The extraction can be accomplished in a batch operation or in a continuous manner concurrently or countercurrently with countercurrent flow preferred. Apparatus for accomplishing intermixing and separation of two substantially immiscible phases are well-known in the art and any conventional apparatus can be used for this purpose. It is preferred to operate the extraction in the aqueous continuous mode using a 3 to 8 stage, preferably 5 to 8 stage, counter-current uranium extraction unit. In general, the volume ratio of the wet-process acid to the extractant solution during extraction should be between about 1:1 and 10:1.

After extraction, the wet-process acid is returned to the acid producer to be evaporated to about 54% "merchant acid", which is either sold or used to manufacture a variety of products, chiefly fertilizers. Preferably, any extractant entrained in the wet-process acid during extraction is removed from the wet-process acid before the acid is returned to the acid producer. The entrained extractant can be removed by any conventional technique including the use of one or more flotation cells.

The uranium in the APPA extractant is oxidized and the uranium converted from the tetravalent state to the hexavalent state in the extractant. The preferred oxidizing agent is hydrogen peroxide; however, other oxidizing agents such as sodium chlorate could be employed. The hydrogen peroxide is preferably added to the extractant as an about 25 to 50% by volume aqueous solution. The amount of oxidizing agent added should be in excess of the stoichiometric amount required to oxidize the uranium content of the extractant to the $+6$ state ($UO_2^{++}$).

In the next step of the process, the extractant is stripped of its uranium content by contacting the extractant with an alkaline stripping solution to precipitate uranium and any ferric iron present in the extractant. The alkaline stripping solution is an aqueous solution of an alkali metal or ammonium carbonate or hydroxide. The preferred stripping solution is an ammonium-ion containing solution such as an aqueous ammonium carbonate solution. The terminology "carbonate" also is intended to encompass bicarbonate. The uranium from the extractant is precipitated in the stripping solution as, for example, ammonium uranyl tricarbonate (AUT) or ammonium diuranate (ADU). Any ferric iron in the extractant is precipitated in the stripping solution as ferric hydroxide ($Fe(OH_3)$).

The alkaline stripping solution is maintained saturated with uranium so that uranium stripped into the stripping solution will precipitate in the stripping solution. In general, the pH of the alkaline stripping solution should be about 8 to 12, preferably about 9 to 10. For example, if an ammonium carbonate solution is used, it should be about 0.5 to 3M. The temperature in the stripping stage will normally be about the same as the temperature to which the acid is cooled prior to extraction.

The APPA extractant is washed to remove any alkaline stripping solution entrained in the extractant. Preferably, this is accomplished in a separate washing step in which the extractant is washed with make-up for the alkaline stripping solution. For example, the extractant is washed with an aqueous ammonium carbonate solution.

The washed extractant is recycled for contact with fresh wet-process acid. Prior to contact with the acid, however, a portion of the recycled barren extractant is removed as a bleed stream. The bleed stream is passed through a distillation column or the like to separate the diluent and modifier contained in the bleed stream from the APPA and decomposition products such as ortho-esters formed by hydrolysis of the APPA. The diluent and modifier are then combined with fresh APPA extractant and fed back into the recycled barren extractant stream.

The volume of the bleed stream, which is typically about 5 to 15% of the recycled barren organic extractant stream, is based on the quantity of fresh APPA required to be added to keep the APPA concentration in the extraction solution approximately the same. The APPA concentration of the fresh extractant is typically about 20 to 200 g/l. The volume of fresh extractant plus modifier fed back into the recycled barren extractant stream will be substantially the same as the volume of extractant solution removed in the bleed stream.

The recycled barren extractant stream may, if desired, be acidulated with mineral acid such as phosphoric acid prior to being recontacted with wet-process acid in extraction. The acidulation converts the APPA extractant from its salt form (e.g., ammonium form) to its acid form. Otherwise, the extractant will be acidified during the first stages of contact with the wet-process acid.

The alkaline stripping solution, after being separated from the extractant, is fed to a conventional solids separator such as a centrifuge or filter. The precipitate is separated from the alkaline stripping solution in the solids separator. The alkaline stripping solution is recycled for contact with pregnant APPA extractant.

The precipitate removed from the alkaline stripping solution must be treated prior to drying and calcination to separate any ferric iron solids from the uranium precipitate. Preferably, the solids separated from the alkaline stripping solution are mixed with an aqueous solution and heated to a sufficiently high temperature to dissolve substantially all of the uranium precipitate. The ferric hydroxide solids are then removed in a second conventional solids separator such as a centrifuge or filter. The solution can then be colled to reprecipitate the uranium. The uranium precipitate is separated from the aqueous solution in a third conventional solids separator such as a centrifuge or filter. The aqueous solution is recycled, and the uranium precipitate dried in a dryer and calcined in a calciner, both of which are conventional and preferably indirectly fired.

As an alternative to the above processing sequence, the solution remaining after separation of the ferric hydroxide solids can be heated to a sufficiently high temperature to drive off ammonia and carbon dioxide and precipitate uranium quantitatively as uranyl carbonates. The precipitate is filtered off, dried and calcined.

In order to facilitate an easier understanding of the uranium recovery stages of the present invention, a flow sheet illustrating the process is provided in the figure. Wet-process phosphoric acid is introduced into ferric iron reduction unit 10 and the ferric iron concentration reduced. The reduced wet-process acid is introduced via line 14 into cooling unit 16 in which the acid is cooled. After cooling, the acid is fed via line 18 to clarification unit 20. The solids separated in clarification unit 20 are fed via line 24 to solids separator 26. In the separator 26, residual acid is separated from the solids and recycled to extraction via line 28. The separated solids are fed to disposal via line 30.

The clarified acid is introduced via line 34 into a countercurrent uranium extraction unit 36, while an APPA extractant solution containing a modifier is introduced into the unit via recycle line 38. After extraction, the raffinate acid is fed to extractant removal unit 40 via line 44. The raffinate acid is returned to the acid producer via line 46 to be evaporated into "merchant acid". The extractant removed from the raffinate acid in extractant removal unit 40 is recycled to extraction via line 48.

The extractant, now rich in uranium, is fed via line 50 to oxidation unit 52 and then introduced into Fe(OH)$_3$ and AUT precipitation unit 54 via line 56, while an ammonium carbonate stripping solution saturated in AUT is introduced into the unit via recycle line 58. After being stripped of its uranium content, the extractant from precipitation unit 54 is fed to extractant wash unit 60 via line 62 and is then recycled to uranium extraction unit 36 via recycle line 38. Stripping solution make-up is fed to extractant wash unit 60 via line 64 and then fed to precipitation unit 54 via line 66.

A portion of the recycled barren extractant is removed from recycle line 38 via bleed line 68 and fed to distillation unit 70. The overhead from the distillation unit 70, principally diluent and modifier, is fed via line 74 to extractant make-up tank 76, while the bottoms from the distillation unit 70, principally APPA extractant and hydrolysis products, are fed to discard via line 78. Fresh APPA is introduced into extractant make-up tank 76 and the resulting fresh extractant solution introduced into recycle line 38 via line 84.

The ammonium carbonate stripping solution from precipitator 54 is fed via line 86 to solids separator 88. The AUT and Fe(OH)$_3$ solids separated in solids separator 88 are introduced into AUT dissolver unit 90 via line 94, while the ammonium carbonate stripping solution from solids separator unit 88 is recycled to stripping via recycle line 58.

In AUT dissolver unit 90, the solids are combined with a solution of AUT fed to the dissolver unit 90 via recycle line 96. The mixture is heated in AUT dissolver unit 90 by heating unit 98 to dissolve the AUT while the ferric hydroxide remains undissolved. The solution from AUT dissolver unit 90 is fed to solids separator 100 via line 104. Ferric hydroxide solids are removed from solids separator unit 100 via line 106, and the resulting AUT solution fed to AUT crystallizer unit 108 via line 110. In AUT crystallizer unit 108, the solution is cooled by cooling unit 114 to crystallize AUT. The solution containing the crystallized AUT is fed to solids separator 116 via line 118. AUT solids are removed from solids separator unit 116 via line 120 and the solution of AUT recycled via line 96. The AUT solids are dried in AUT drier unit 124 after which the dried solids are fed to the final calciner unit 126 via line 128. In the final calciner unit 126, the AUT solids are decomposed thermally to yield a high-grade U$_3$O$_8$ product.

To facilitate a better understanding of the advantages and operation of the present invention, the following examples are provided to specifically illustrate the invention:

EXAMPLE 1

Wet-process phosphoric acid was fed to a three-stage countercurrent extraction unit at a flow rate of 88 ml/min. The wet-process acid contained 165 mg/l total uranium, 5.5 g/l ferric iron, and 29.5% P$_2$O$_5$ by weight and had a temperature of 50° C. The wet-process acid was contacted in the extraction unit at an aqueous to organic ratio of 4:1 for 20 minutes per cycle with an extractant solution containing 70 g/l isodecyl pyrophosphoric acid in a kerosene diluent. The extractant solution also contained 52 ml/l n-octanol modifier. The flow rate of the extractant solution was 22 ml/min. The pregnant extractant was oxidized with a 50% by volume aqueous solution of hydrogen peroxide which was introduced into the barren extractant at a flow rate of 0.08 ml/min.

The barren extractant was introduced into a two-stage countercurrent stripping unit and contacted with a 2 molar aqueous solution of ammonium carbonate at an aqueous to organic ratio of 2:1. The flow rate of the ammonium carbonate solution was 44 ml/min and the solution had a pH of 9.3 to 9.6. A bleed stream was removed from the barren extractant downstream of the stripping unit at a flow rate of 1.6 ml/min, and fresh extractant solution was added to the barren extractant downstream of the bleed stream at a flow rate of 1.6 ml/min. The fresh extractant solution contained 135 g/l isodecyl pyrophosphoric acid and 52 ml/l n-octanol modifier. The barren extractant was then returned to extraction.

The process was continued until the extractant had completed 36 cycles of combined extraction and stripping. A steady state analysis was as follows. The raffinate acid contained 25 mg/l total uranium, 5.36 g/l ferric iron and 29.5% P$_2$O$_5$ and had a flow rate of 88 ml/min. The pregnant extractant contained 65 g/l isodecyl pyrophosphoric acid, 50 ml/l n-octanol modifier, and 5 g/l mono orthophosphate esters. The total uranium and ferric iron concentrations of the pregnant extractant were 572 mg/l and 1.5 g/l, respectively. The bleed stream contained 65 g/l isodecyl pyrophosphoric acid, 50 ml/l n-octanol modifier, 12 mg/l total uranium and 1.0 g/l ferric iron. The stripping solution after contact with the extractant contained 651 mg/l AUT, 280 mg/l total uranium, 480 mg/l ferric hydroxide (Fe(OH)$_3$) and 2.5 g/l mono orthophosphate esters.

EXAMPLE 2

Wet-process phosphoric acid was fed to a three-stage countercurrent extraction unit at a flow rate of 44 ml/min. The wet-process acid contained 165 mg/l total uranium, 6.5 g/l ferric iron, and 29.5% P$_2$O$_5$ by weight and had a temperature of 50° C. The wet-process acid was contacted in the extraction unit at an aqueous to organic ratio of 4:1 for 40 minutes per cycle with an extractant solution containing 70 g/l isodecyl pyrophosphoric acid in a kerosene diluent. The extractant solution also contained 52 ml/l isodecanol modifier. The flow rate of the extractant solution was 11 ml/min. The pregnant extractant was oxidized with a 50% by volume aqueous solution of hydrogen peroxide which was introduced into the barren extractant at a flow rate of 0.04 ml/min.

The barren extractant was introduced into a two-stage countercurrent stripping unit and contacted with a 2 molar aqueous solution of ammonium carbonate at an aqueous to organic ratio of 6:1. The flow rate of the ammonium carbonate solution was 66 ml/min and the solution had a pH of 9.6 and was saturated with uranium. A bleed stream was removed from the barren extractant downstream of the stripping unit at a flow rate of 0.81 ml/min, and fresh extractant solution was added to the barren extractant downstream of the bleed stream at a flow rate of 0.81 ml/min. The fresh extractant solution contained 135 g/l isodecyl pyrophosphoric acid and 52 ml/l isodecanol modifier. The barren extractant was then returned to extraction.

The ammonium carbonate stripping solution exiting the stripping unit was filtered and the filtrate recycled to stripping. A make-up stream was added to the recycled filtrate prior to stripping. The make-up stream comprised 0.07 g/min ammonia, 0.09 g/min carbon dioxide, and 0.01 g/min water.

The process was continued for 15 cycles at which time the ammonium carbonate stripping solution was saturated with uranium. Analysis after 15 cycles was as follows. The raffinate acid contained 25 mg/l total uranium, 6.3 g/l ferric iron and 29.5% $P_2O_5$ and had a flow rate of 44 ml/min. The pregnant extractant contained 65 g/l isodecyl pyrophosphoric acid, 52 ml/l isodecanol modifier, and 5 g/l mono orthophosphate esters. The total uranium and ferric iron concentrations of the pregnant extractant were 574 mg/l and 2.0 g/l, respectively. The bleed stream contained 65 g/l isodecyl pyrophosphoric acid, 52 ml/l isodecanol modifier, 14 mg/l total uranium and 1.2 g/l ferric iron. The stripping solution after contact with the extractant contained 216 mg/l AUT, 93 mg/l total uranium, 261 mg/l ferric hydroxide and also mono orthophosphate esters. The solids filtered out of the stripping solution comprised 14.3 mg/min AUT after saturation and 17.2 mg/min ferric hydroxide.

EXAMPLE 3

The process described in Example 2 was modified to incorporate a washing stage downstream of the stripping unit. The barren extractant was fed through the washing stage which was operated at an aqueous to organic ratio of 0.2:1 and then recycled to extraction. Also fed into the washing unit was a 2 molar aqueous solution of ammonium carbonate at a flow rate of 2 ml/min. Also, the stripping unit was operated at an aqueous to organic ratio of 4:1 by changing the ammonium carbonate stripping solution flow rate from 66 ml/min to 42 ml/min. Finally, a bleed stream was removed from the recycled filtrate at a rate of 2.2 ml/min and the make-up stream adjusted to 0.05 g/min ammonia and 0.07 g/min carbon dioxide. The process was continued for an additional 21 cycles or a total of 36 completed cycles.

The analysis during the 36th cycle was as follows. The analysis of the raffinate acid was the same as in Example 2. The pregnant extractant analysis also was the same as in Example 2 except that the total uranium concentration was 556 mg/l rather than 574 mg/l. The bleed stream analysis also was the same as in Example 2. The barren extractant contained 304 mg/l total uranium upstream of the washing unit and 76 mg/l total uranium downstream of the washing unit. The ammonium carbonate stripping solution after contact with the extractant contained 279 mg/l AUT, 120 mg/l total uranium, 392 mg/l ferric hydroxide and also mono orthophosphate esters. The solids were removed from the filter at the rate of 12.34 mg/min AUT and 16.5 mg/min ferric hydroxide. The solids analyzed 15.29% actual total uranium compared with a theoretical uranium content of 18.3%.

What is claimed is:

1. A process for stripping uranium from a pregnant organic extractant comprising an alkyl pyrophosphoric acid dissolved in a substantially water-immiscible organic diluent, said organic extractant containing tetravalent uranium and an alcohol or phenol modifier in a quantity sufficient to retain substantially all the unhydrolyzed alkyl pyrophosphoric acid in solution in said diluent during stripping, comprising adding an oxidizing agent to said organic extractant and thereby oxidizing the tetravalent uranium to the +6 state in said organic extractant, and contacting said organic extractant containing said uranium in the +6 state with a stripping solution comprising an aqueous solution of an alkali metal or ammonium carbonate or hydroxide thereby stripping uranium from said organic extractant into said stripping solution, and separating the resulting barren organic extractant containing substantially all of the unhydrolyzed alkyl pyrophosphoric acid dissolved in said diluent from said stripping solution containing said stripped uranium, said barren extractant being suitable for recycle.

2. The process of claim 1 in which said alkyl pyrophosphoric acid is a reaction product of phosphoric oxide and an alcohol containing 4 to 20 carbon atoms.

3. The process of claim 2 wherein said alcohol contains 6 to 12 carbon atoms.

4. The process of claim 1 in which said organic extractant contains about 10 to 100 g/l of said alkyl pyrophosphoric acid.

5. The process of claim 1 in which said modifier is an essentially water-immiscible alcohol or phenol which is substantially soluble in said diluent and contains an —OH group which will bond to said alkyl pyrophosphoric acid by hydrogen bonding.

6. The process of claim 5 in which said alcohol in an aliphatic or substituted aliphatic or alicyclic alcohol containing 4 to 20 carbon atoms.

7. The process of claim 6 in which said alcohol contains 6 to 12 carbon atoms.

8. The process of claim 1 in which said organic extractant contains a maximum of about 1 mole of said modifier per atom of P contained in said organic extractant.

9. The process of claim 1 in which said oxidizing agent is hydrogen peroxide.

10. The process of claim 1 in which said stripping solution is an ammonium-ion containing solution.

11. The process of claim 10 in which said ammonium-ion containing solution is an aqueous ammonium carbonate solution.

12. The process of claim 1 in which said stripping solution has a pH of about 8 to 12.

13. The process of claim 12 in which said pH is about 9 to 10.

14. The process of claim 1 in which the weight ratio of said modifier to said alkyl pyrophosphoric acid is about ½ to ¾.

15. A process for stripping uranium from an organic extractant comprising an alkyl pyrophosphoric acid dissolved in an essentially water-immiscible organic diluent, said organic extractant containing tetravalent uranium and ferric iron and an essentially water-immiscible alcohol or phenol modifier having at least one —OH group capable of hydrogen bonding with said alkyl pyrophosphoric acid, said modifier being present in said organic extractant in a concentration sufficient to retain substantially all the unhydrolyzed alkyl pyrophosphoric acid in solution in said diluent during stripping and being present in a maximum concentration of 1 mole per atom of P present in said organic extractant, comprising adding an oxidizing agent to said organic extractant and thereby oxidizing said tetravalent uranium to the +6 state in said organic extractant, contacting said organic extractant containing said uranium in the +6 state with a stripping solution comprising an aqueous solution of an alkali metal or ammonium carbonate or hydroxide having a pH of about 8 to 12 thereby stripping uranium and ferric iron from said organic extractant and precipitate said stripped uranium and said stripped ferric iron in said stripping solution, and separating the resulting barren organic extractant containing substantially all of the unhydrolyzed alkyl pyrophosphoric acid from said stripping solution containing said precipitated uranium and ferric iron, said barren extractant being suitable for recycle.

16. The process of claim 15 in which said alkyl pyrophosphoric acid is a reaction product of phosphoric oxide and an alcohol containing 4 to 20 carbon atoms.

17. The process of claim 16 in which said alcohol contains 6 to 12 carbon atoms.

18. The process of claim 15 in which said organic extractant contains about 10 to 100 g/l of said alkyl pyrophosphoric acid.

19. The process of claim 15 in which said modifier is an alcohol containing 4 to 20 carbon atoms.

20. The process of claim 19 in which said alcohol contains 6 to 12 carbon atoms.

21. The process of claim 15 in which said oxidizing agent is hydrogen peroxide.

22. The process of claim 15 in which said stripping solution is an ammonium-ion containing solution.

23. The process of claim 22 in which said ammonium-ion containing solution is ammonium carbonate.

24. The process of claim 15 in which said pH of said stripping solution is about 9 to 10.

25. The process of claim 15 in which said organic extractant has a temperature of about 55° C. or below.

26. A process for recovering uranium from wet-process phosphoric acid comprising contacting wet-process phosphoric acid containing tetravalent uranium with an organic extractant to extract said tetravalent uranium from said wet-process phosphoric acid, said organic extractant comprising an alkyl pyrophosphoric acid dissolved in an essentially water-immiscible organic diluent and a modifier to retain substantially all the unhydrolyzed alkyl pyrophosphoric acid in solution in said diluent during stripping, separating said organic extractant containing said tetravalent uranium from said wet-process phosphoric acid, adding an oxidizing agent to said pregnant organic extractant and thereby oxidizing said tetravalent uranium to the +6 state in said organic extractant, contacting said pregnant organic extractant containing said uranium in the +6 state with a stripping solution comprising an aqueous solution of an alkali metal or ammonium carbonate or hydroxide thereby stripping uranium from said pregnant organic extractant into said stripping solution, separating the resulting organic extractant containing substantially all of the unhydrolyzed alkyl pyrophosphoric acid from said stripping solution containing said stripped uranium, and recycling said barren organic extractant for contacting with fresh wet-process phosphoric acid.

27. The process of claim 26 in which said barren organic extractant is washed to remove any stripping solution entrained in said extractant.

28. The process of claim 26 in which a portion of said recycled barren organic extractant is treated to separate diluent and modifier from the remainder of said organic extractant, fresh alkyl pyrophosphoric acid is added to said separated diluent and modifier to form fresh organic extractant, and said fresh organic extractant is added to said recycled barren organic extractant.

29. The process of claim 28 in which said diluent and said modifier are separated by distillation.

30. The process of claim 26 in which said recycled barren organic extractant is reacidulated with a mineral acid.

31. The process of claim 26 in which said stripped uranium is precipitated in said stripping solution, said precipitate is separated from said stripping solution, and said stripping solution is recycled for contact with pregnant organic extractant.

32. The process of claim 31 in which ferric iron is also precipitated in said stripping solution and separated from said stripping solution with said precipitated uranium.

33. The process of claim 32 in which said precipitated uranium is dissolved in an aqueous solution, said ferric iron solids are separated from said aqueous solution, and said dissolved uranium is reprecipitated.

34. The process of claim 33 in which said precipitated uranium is dissolved by heating and reprecipitated by cooling.

35. The process of claim 33 in which said dissolved uranium is reprecipitated by heating.

36. The process of claims 34 or 35 in which said reprecipitated uranium is dried and calcined to form a final $U_3O_8$ product.

37. A process for recovering uranium from wet-process phosphoric acid comprising contacting wet-process phosphoric acid containing tetravalent uranium with an organic extractant to extract said tetravalent uranium from said wet-process phosphoric acid, said organic extractant comprising an alkyl pyrophosphoric acid dissolved in an essentially water-immiscible organic diluent and a modifier to retain substantially all the unhydrolyzed alkyl pyrophosphoric acid in solution in said diluent during stripping, said modifier being present in said organic extractant in a weight ratio relative to said alkyl pyrophosphoric acid of about $\frac{1}{2}$ to $\frac{3}{4}$, separating said organic extractant containing said tetravalent uranium from said wet-process phosphoric acid, adding an oxidizing agent to said pregnant organic extractant and thereby oxidizing said tetravalent uranium to the +6 state in said organic extractant, contacting said pregnant organic extractant with a stripping solution comprising an aqueous solution of an alkali metal or ammonium carbonate or hydroxide thereby stripping uranium from said pregnant organic extractant into said stripping solution and precipitate said uranium in said stripping solution, separating the resulting barren organic extractant containing substantially all of the unhydrolyzed alkyl pyrophosphoric acid from said stripping solution containing said stripped uranium, recycling barren organic extractant for contacting with fresh wet-process phosphoric acid, treating a portion of said recycled barren organic extractant to separate diluent and modifier from the remainder of said organic extractant, adding fresh alkyl pyrophosphoric acid to said separated diluent and modifier to form fresh organic extractant, adding said fresh organic extractant to said recycled barren organic extractant, separating said precipitated uranium from said stripping solution, and recycling said stripping solution for contacting with fresh pregnant organic extractant.

38. The process of claim 37 in which ferric iron is also precipitated in said stripping solution and separated from said stripping solution with said precipitated uranium.

39. The process of claim 38 in which said precipitated uranium is dissolved in an aqueous solution, said ferric iron solids are separated from said aqueous solution, and said dissolved uranium is reprecipitated.

40. The process of claim 39 in which said precipitated uranium is dissolved by heating and reprecipitated by cooling.

41. The process of claim 39 in which said dissolved uranium is reprecipitated by heating.

42. The process of claims 40 and 41 in which said reprecipitated uranium is dried and calcined to form a final $U_3O_8$ product.

* * * * *